3,362,986
FLUOROACETONE ALKYL HEMIKETAL
ALPHA-CHLOROACETATES
Peter E. Newallis, Morris Plains, and Pasquale Lombardo,
Hanover, N.J., assignors to Allied Chemical Corporation, New York, N.Y., a corporation of New York
No Drawing. Filed Sept. 28, 1964, Ser. No. 399,906
6 Claims. (Cl. 260—487)

ABSTRACT OF THE DISCLOSURE

Pesticidally active fluoroacetone alkyl hemiketal chloroacetates prepared by reacting fluoroacetone alkyl hemiketals with mono or dichloroacetyl chloride.

---

This invention relates to new pesticidally active compounds and more particularly to new fluoroacetone alkyl hemiketal chloroacetates and to the process for preparing them by the reaction of fluoroacetone alkyl hemiketals with mono or dichloroacetyl chloride.

The new compounds of our invention are prepared according to the reaction shown below

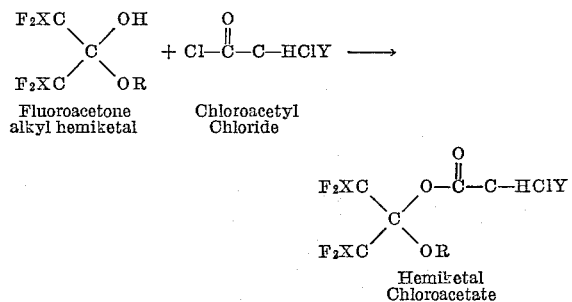

wherein X is chlorine or fluorine, Y is hydrogen or chlorine, and R is an alkyl radical.

In carrying out the preparation of our new compounds, the fluoroacetone alkyl hemiketal is mixed with a substantially equimolecular amount of the chloroacetyl chloride in an inert solvent reaction medium such as ethyl ether, isopropyl ether, benzene, toluene, chlorobenzene, etc. and a hydrogen halide acceptor such as pyridine, triethyl amine, sodium carbonate, etc., preferably dissolved in a solvent reaction medium is added to the mixture preferably at temperatures between about 5° C. and about 50° C. slowly with agitation. The reaction is rapid and somewhat exothermic. After completion of the addition of hydrogen hailde acceptor, the mixture can be allowed to warm to ambient temperatures and agitation is continued until reaction is complete, usually a period of not more than about one hour. The by-product salt, e.g. pyridine hydrochloride, is removed as by filtration, and the filtrate is treated as by distillation to remove the reaction medium, and may be further purified if desired as by distillation.

The temperature of reaction is not critical and may suitably range from 0° C. to about 100° C.

The resulting fluoroacetone hemiketal chloroacetates, which can also be styled α-chloro(alkyloxy fluoromethyl fluoroethyl) acetates, are oily liquids soluble in most common organic solvents including acetone, benzene, ethyl alcohol, carbon tetrachloride, etc., and are insoluble in water.

They are useful as pesticides in a number of fields particularly as fumigants against grain infesting insects, as toxicants against house flies, and as herbicides in the selective control of unwanted growth of weed plants and weed seeds.

In applying our new compounds as herbicides, they may be applied to the medium to be treated, such as soil or the living plants, as solutions in a suitable solvent such as acetone, or as emulsions in water, or as suspensions of wettable powders in water, or as dry, fine, or granular dusts or powders. Applied in solution, emulsion, or wettable powder form, they are usually sprayed onto the soil, or plant to be controlled, and may be applied at various appropriate dosage levels of, for example, 16, 8, or 4 pounds active toxicant per acre, depending on seeds or plants to be controlled.

In preparing solutions for emulsifying in water, the compounds are dissolved in a suitable solvent and a surface-active agent added to the solution to permit emulsification of the solution in water.

In preparing dusting powders, our compounds are dispersed in a finely or coarsely divided solid dusting material such as talc; clays such as attapulgite, kaolin, or fuller's earth; wood flour or other inert solid carriers of the type commonly employed in formulating herbicidal dusting compositions. Wettable powder formulations suitable for dispersing in water and applying the water dispersions to the soil or plants, are prepared by incorporating in the above fine dusting powder small amounts of surface active materials, for example, about 1% to 5% by weight, which serve to maintain the finely powdered composition dispersed in water with which it is mixed.

Sutable surface active materials are the anionic and cationic wetting, dispersing and emulsifying agents commonly employed in the formation of wettable powder and emulsifiable concentrate compositions, for example, the alkali metal and ammonium salts of long chain aliphatic carboxylic acids, sulfonates of aromatic or long chain aliphatic hydrocarbons, such as sodium alkyl sulfates and sulfonats, alkyl aryl sulfonate salts, sulfonates of glycerides and their fatty acids, and sulfonates of derivatives of fatty acid esters.

In applying the compounds as insecticides, the toxic compound may be combined with food as a bait to attract the insect, for example, sugar or the like, as a carrier. As a fumigant, the compounds may be applied alone or incorporated with a solid or liquid carrier, and the insects are contacted with the vapor of the fumigant compound.

The following specific examples further illustrate our invention. Parts are by weight except as otherwise noted.

Example 1

To a solution of 21.2 grams of hexafluoroacetone ethyl hemiketal in 100 ml. of isopropyl ether was added 11.3 grams of chloroacetyl chloride. A solution of 7.9 grams of pyridine in 50 ml. of isopropyl ether was added dropwise with stirring over a period of 15 minutes. The reaction was slightly exothermic, the temperature rising to 30°–35° C. The reaction mass was then heated briefly to approximately 70° C., cooled to room temperature and filtrated to remove the salt by-product, and the solvent, isopropyl ether, was removed by distillation, and the residue was distilled to give 17 grams of alpha-cholro-(1-ethoxy-1-trifluoromethyl-2,2,2-trifluoroethyl) acetate

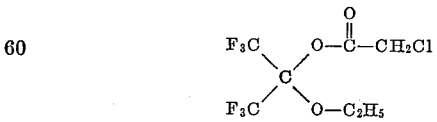

boiling point 36°–40° C. at 2.4–3.2 mm.; theoretical carbon 29.2 percent, found 30.1 percent; theoretical hydrogen 2.44 percent, found 2.91 percent.

Example 2

In a 1 liter, three-neck flask was placed 64.8 grams of hexafluoroacetone decyl hemiketal, 22.6 grams of chloroacetyl chloride and 100 ml. of anhydrous ethyl ether. To this mixture cooled to 15°–20° C. was added dropwise with stirring a solution of 15.8 grams of pyridine and 100 ml. of ethyl ether. After completion of the addition, the mixture was allowed to warm to room temperature, 28° C., with stirring for three hours. The mixture was filtered to remove the salt by-product and the filtrate washed twice with water, separated and dried over $Na_2SO_4$. The solvent, ethyl ether, was removed in vacuo leaving 30 grams of alpha-chloro-(1-decyloxy-1-trifluoromethyl-2,2,2-trifluoroethyl) acetate,

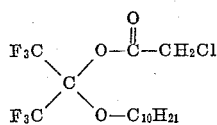

boiling point 127°–132° C. at 3.0 mm.

Example 3

In a three-neck, 1 liter flask surrounded by an ice cooling bath, was placed 147 grams of tetrafluorodichloroacetone ethyl hemiketal dissolved in 150 ml. of isopropyl ether. To this was added 67.8 grams of chloroacetyl chloride dissolved in 50 ml. of isopropyl ether. While maintaining the temperature at about 15° C., a solution of 47.4 grams of pyridine and 50 ml. of isopropyl ether was added dropwise with stirring. After the addition was completed, the mixture was allowed to stir overnight. The reaction mass was filtered to remove the salt by-product; then the filtrate was washed twice with water, dried over $MgSO_4$, and distilled to remove the solvent, isopropyl ether. The resulting oil was distilled to give 88.5 grams of alpha-chloro-(1 - ethoxy - 1 - chlorodifluoromethyl-2-chloro-2,2-difluoroethyl) acetate

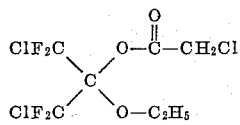

boiling point 58°–60° C. at .8 mm., theoretical carbon 26.1 percent, found 26.4 percent; theoretical hydrogen 2.19 percent, found 2.65 percent; theoretical chlorine 33.2 percent, found 34.2 percent.

Example 4

In a reaction vessel were mixed 26 grams of tetrafluorodichloroacetone isopropyl hemiketal dissolved in 50 ml. of cold isopropyl ether and 11 grams of chloroacetyl chloride dissolved in 50 ml. of isopropyl ether and the mixture was cooled at 5° C. To this cold mixture was added dropwise and with stirring eight grams of pyridine dissolved in 50 ml. of isopropyl ether. The temperature was maintained at 5°–10° C. during the addition. After completion of the addition, the mixture was allowed to warm to room temperature with stirring. The mixture was then refluxed for three hours at 72° C., cooled, the salt by-product was filtered off, the filtrate was extracted twice with water, dried over $MgSO_4$, and then the solvent, isopropyl ether, was removed in vacuo and the remaining liquid was distilled, giving 14 grams of an oil with a boiling point of 95°–97° C. at 4.35 mm. This compound was

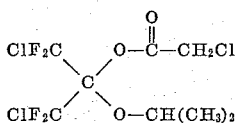

alpha-chloro-(1-isopropoxy - 1 - chlorodifluoromethyl-2-chloro-2,2-difluoroethyl) acetate; theoretical carbon 28.6 percent, found 28.9 percent; theoretical hydrogen 2.7 percent, found, 2.7 percent; theoretical chlorine 31.6 percent, found 31.5 percent; and theoretical fluorine 22.6 percent, found 23.7 percent.

Example 5

In a 1 liter, three-neck flask was placed 98 grams of tetrafluorodichloroacetone ethyl hemiketal and 75 ml. of anhydrous ethyl ether. The solution was cooled at 5° C. and then 59 grams of dichloroacetyl chloride in 75 ml. of ethyl ether was added rapidly with stirring and cooling. To this mixture was added with stirring and cooling 31.6 grams of pyridine in ethyl ether. The temperature was maintained at below 10° C. After completion of the addition, the reaction mass was stirred for one hour, poured into water, separated, washed again with water, dried over $MgSO_4$, filtered, and the solvent was removed in vacuo at room temperature yielding 144 grams of oil. The oil was redried over $MgSO_4$, filtered and the $MgSO_4$ washed with ethyl ether, stripped at room temperature yielding 139 grams of oil. This oil was distilled three times, yielding 24 grams of alpha-alpha dichloro(1-ethoxy-1-chlorodifluoromethyl-2-chloro-2,2-difluoro) ethyl acetate,

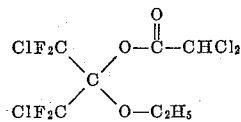

boiling point 53°–69° C. at 0.75 mm.; theoretical carbon 23.0 percent, found 23.4 percent; theoretical hydrogen 1.70 percent, found 1.70 percent; and theoretical fluorine 20.8 percent, found 22.0 percent.

Example 6

Alpha - chloro-(1-ethoxy-1-trifluoromethyl-2,2,2 - trifluoroethyl) acetate was tested as a fumigant against a series of adult and larval insects by placing ten insects of each species in 1.5 inch diameter salve tins with perforated lids. A small amount of appropriate food was placed in each tin. The tins were placed in gallon jars and the appropriate dosages of .05 cc. and .02 cc. per jar of alpha-chloro-(1-ethoxy-1-trifluoromethyl-2,2,2 - trifluoroethyl) acetate were placed on cellucotton wads in the jars which were then sealed. After 24 hours exposure insect containers were removed and mortality counts were made seven days after removal with results shown in the table below in comparison with control jars similarly treated except that no toxicant was included.

| Organism | Percent 7-Day Mortality at Dosage, cc./jar | |
| --- | --- | --- |
| | .05 | .02 |
| Confused Flour Beetle Adults | 100 | 100 |
| Lesser Meal Worm Adults | 100 | 00 |
| Yellow Meal Worm Larvae | 80 | 20 |
| No toxicant | 0 | 0 |

It is apparent from the above table that alpha-chloro-(1 - ethoxy-1-trifluoromethyl-2,2,2-trifluoroethyl) acetate exerts complete control of confused flour beetle adults and lesser meal worm adults even at the low dosage of 0.02 cc. of the toxicant per gallon of space.

Example 7

Alpha - chloro-(1-decyloxy-1-trifluoromethyl-2,2,2-trifluoroethyl) acetate was tested for pre-emergence herbicidal activity against rape and ryegrass weeds in the presence of crops. In this test crop seeds are planted in separate flats, in single rows, and covered with 1¼ inches of soil. The weed seeds are then uniformly broadcast seeded in the same flats and covered with soil. The flats were uniformly watered. Within one day after seeding two flats were sprayed with a solution in acetone of the above toxicant at rates of 80 gallons of solution per acre equivalent to 16 pounds per acre. Treated flats and other flats similarly prepared except that no toxicant was used, were placed in a greenhouse and watered by sub-irrigation and held for a 16-day observation period after which they were rated on an "injury rating," IR, scale of 0 to 10, in which 0 means no apparent injury; 1, 2, 3—slight injury; 4, 5, 6—moderate injury; 7, 8, 9—severe injury; and 10—plants dead. Plant mortality was also determined on a percentage basis, i.e. % PK, as compared to the untreated plots. Results of these tests are shown in the table below.

| Crops and weeds | Dosage, pounds per acre | |
| --- | --- | --- |
| | 16 | None |
| Corn: | | |
| IR | 0 | 0 |
| Percent PK | 0 | 0 |
| Wheat: | | |
| IR | 0 | 0 |
| Percent PK | 0 | 0 |
| Soybeans: | | |
| IR | 0 | 0 |
| Percent PK | 0 | 0 |
| Ryegrass: | | |
| IR | 7 | 0 |
| Percent PK | 65 | 0 |
| Rape: | | |
| IR | 7 | 0 |
| Percent PK | 65 | 0 |

It will be seen from the table that alpha-chloro-(1-decyloxy-1-trifluoromethyl-2,2,2 - trifluoroethyl) acetate exerts a 65% kill on the weed seeds ryegrass and rape with no injury to the crop seeds corn, wheat, or soybeans.

In a similar test in which alpha,alpha, dichloro-(1-ethoxy-1-chlorodifluoromethyl - 2 - chloro-2,2-difluoro) ethyl acetate was used as the toxicant, control of weed seeds was effected to a somewhat lesser extent.

*Example 8*

Alpha - chloro - (1 - ethoxy-1-chlorodifluoromethyl-2-chloro-2,2-difluoroethyl) acetate was tested as a toxicant against adult house flies by preparing a wettable powder containing 25% of the above toxicant, and mixing 0.4 grams of this wettable powder with 9.6 grams of granulated sugar. For each test about ½ gram of the mixture (i.e. 1% toxicant in the dry bait) was placed in a petri dish and 49 flies were confined over the thus treated sugar with screen hemispheres. The tests were observed after 7 and 9 days for percent kill and number of eggs laid with results shown in the table below.

| Percent Toxicant in bait | No. flies | Percent Kill | | 1st Eggs laid |
| --- | --- | --- | --- | --- |
| | | 7-Day | 9-Day | |
| 1% | 49 | 77.6 | 96.0 | None. |
| None | 51 | 0 | 0 | 1st Day. |

It will be seen from the table that alpha-chloro-(1-ethoxy-1-chlorodifluoromethyl-2-chloro-2,2-difluoroethyl) acetate exerts a lethal effect against adult house flies.

We claim:
1. As new compositions of matter the fluoroacetone hemiketal chloroacetates of the formula

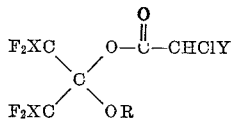

wherein X is a halogen selected from the group consisting of fluorine and chlorine; Y is a member selected from the group consisting of hydrogen and chlorine; and R is an alkyl radical.

2. α - Chloro(1-ethoxy-1-trifluoromethyl-2,2,2-trifluoroethyl) acetate.

3. α-Chloro(1-decyolxy-1-trifluoromethyl - 2,2,2 - trifluoroethyl) acetate.

4. α-Chloro(1-ethoxy-1-chlorodifluoromethyl-2-chloro-2,2-difluoroethyl) acetate.

5. α - Chloro(1-isopropoxy-1-chlorodifluoromethyl - 2-chloro-2,2-difluoroethyl) acetate.

6. α,α-Dichloro(1-ethoxy - 1 - chlorodifluoromethyl-2-chloro-2,2-difluoroethyl) acetate.

References Cited

UNITED STATES PATENTS

| 2,681,370 | 6/1954 | Husted et al. | 260—615 |
| 3,029,252 | 4/1962 | Simmons | 260—487 X |
| 3,061,649 | 10/1962 | Erickson et al. | 260—615 X |
| 3,254,983 | 6/1966 | Bengelsdorf | 260—478 X |

OTHER REFERENCES

Wagner et al., Synthetic Organic Chemistry, pp. 481–482 (1953), John Wiley & Sons, Inc.

Knunyants et al., Chem. Ab. 54: 22484–22485.

LORRAINE A. WEINBERGER, *Primary Examiner.*

R. K. JACKSON, *Examiner.*

A. P. HALLUIN, *Assistant Examiner.*